(12) United States Patent
De Pena et al.

(10) Patent No.: US 11,390,031 B2
(45) Date of Patent: Jul. 19, 2022

(54) ADDITIVE MANUFACTURING SYSTEM AND METHOD FOR POST-PROCESSING

(71) Applicant: HEWLETT-PACKARD DEVELOPMENT COMPANY, L.P., Houston, TX (US)

(72) Inventors: Alejandro Manuel De Pena, Sant Cugat del Valles (ES); Scott White, Boise, ID (US); Sergio Puigardeu Aramendia, Corvallis, OR (US); Carmen Blasco, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 154 days.

(21) Appl. No.: 16/092,886

(22) PCT Filed: May 12, 2016

(86) PCT No.: PCT/EP2016/060652
§ 371 (c)(1),
(2) Date: Oct. 11, 2018

(87) PCT Pub. No.: WO2017/194109
PCT Pub. Date: Nov. 16, 2017

(65) Prior Publication Data
US 2019/0202132 A1    Jul. 4, 2019

(51) Int. Cl.
*B33Y 30/00* (2015.01)
*B29C 64/393* (2017.01)
(Continued)

(52) U.S. Cl.
CPC .......... *B29C 64/393* (2017.08); *B29C 64/386* (2017.08); *B33Y 10/00* (2014.12);
(Continued)

(58) Field of Classification Search
CPC ..... B29C 64/393; B29C 64/35; B29C 64/386; B29C 64/153; B22F 3/24; B22F 3/1055;
(Continued)

(56) References Cited

U.S. PATENT DOCUMENTS 5,548,375 A * 8/1996 Mitsuya .............. B41F 33/0009
399/38
7,435,368 B2 10/2008 Davidson et al.
(Continued)

FOREIGN PATENT DOCUMENTS

CN    104085110 A    10/2014
CN    104238482 A    12/2014
(Continued)

OTHER PUBLICATIONS 3D systems, "ProJet™ 6000 3D Professional Printer", pp. 72, downloaded from the internet file:///C:/Users/olopez/Documents/e-Red%20Folder/16092886/ProJet%206000%20User%20Guide%20(Part%20No.%20283789-00,%20Rev.%20E).pdf (Year: 2015).*
(Continued)

*Primary Examiner* — Rocio Del Mar Perez-Velez
*Assistant Examiner* — Olvin Lopez Alvarez
(74) *Attorney, Agent, or Firm* — HP Inc. Patent Department

(57) ABSTRACT

A controller-implemented method of controlling a three dimensional (3D) printing process, comprises presenting printing options (20) of the 3D printing process at a user interface (16); accepting settings (22) from the user interface (16) based on the presented printing options (20); determining a printing instruction (24) based on the settings (22), the printing instruction (24) to be used to manufacture a three-dimensional (3D) object; and determining a post-processing
(Continued)

instruction (26) based on the settings (22), the post-processing instruction (26) to be used in post-processing the 3D object.

17 Claims, 3 Drawing Sheets

(51) Int. Cl.
| | |
|---|---|
| *B33Y 50/02* | (2015.01) |
| *B29C 64/386* | (2017.01) |
| *B33Y 10/00* | (2015.01) |
| *G05B 19/4099* | (2006.01) |

(52) U.S. Cl.
CPC ............... *B33Y 30/00* (2014.12); *B33Y 50/02* (2014.12); *G05B 19/4099* (2013.01); *G05B 2219/35134* (2013.01); *G05B 2219/49007* (2013.01)

(58) Field of Classification Search
CPC ......... B22F 2999/00; B22F 2003/1056; G05B 19/4099; G05B 2219/49023; G05B 2219/49007; G05B 2219/35134; B33Y 30/00; B33Y 10/00; B33Y 50/02; Y02P 10/295
See application file for complete search history.

(56) References Cited

U.S. PATENT DOCUMENTS

| | | | |
|---|---|---|---|
| 8,460,755 B2 | 6/2013 | Rodgers | |
| 8,575,258 B2 | 11/2013 | Stockwell et al. | |
| 10,635,368 B2* | 4/2020 | Torrent | B33Y 10/00 |
| 2001/0045678 A1 | 11/2001 | Kubo | |
| 2007/0057412 A1* | 3/2007 | Weiskopf | B33Y 30/00 |
| | | | 264/497 |
| 2008/0072233 A1* | 3/2008 | Steux | G06F 3/1212 |
| | | | 718/106 |
| 2009/0283109 A1* | 11/2009 | Moussa | B29C 64/35 |
| | | | 134/1 |
| 2010/0155985 A1* | 6/2010 | McAlea | B33Y 10/00 |
| | | | 264/113 |
| 2012/0119399 A1* | 5/2012 | Fruth | B29C 64/245 |
| | | | 264/39 |
| 2012/0286453 A1* | 11/2012 | Pettis | G06F 3/126 |
| | | | 264/401 |
| 2013/0015596 A1 | 1/2013 | Mozeika et al. | |
| 2014/0252672 A1 | 9/2014 | Rael | |
| 2015/0145171 A1 | 5/2015 | Walker | |
| 2015/0353750 A1* | 12/2015 | Titterington | B33Y 70/00 |
| | | | 264/308 |
| 2016/0039149 A1* | 2/2016 | Cassara | B29C 64/118 |
| | | | 425/150 |
| 2016/0107392 A1* | 4/2016 | Lubin | B33Y 99/00 |
| | | | 700/98 |
| 2016/0236299 A1* | 8/2016 | Oberhofer | B29C 64/295 |
| 2016/0236416 A1* | 8/2016 | Bheda | B33Y 50/02 |
| 2016/0332375 A1* | 11/2016 | Juan | B33Y 30/00 |
| 2016/0368077 A1* | 12/2016 | Swaminathan | B23K 26/355 |
| 2017/0024925 A1* | 1/2017 | Palmer | G06T 19/20 |
| 2017/0277148 A1* | 9/2017 | Sato | G05B 19/4099 |
| 2017/0297097 A1* | 10/2017 | Gibson | B33Y 50/02 |
| 2018/0207876 A1* | 7/2018 | Querol Esparch | B29C 64/393 |
| 2018/0229301 A1* | 8/2018 | De Pena | B33Y 40/00 |
| 2019/0152145 A1* | 5/2019 | White | B29C 64/259 |
| 2019/0160750 A1* | 5/2019 | Morral | B33Y 30/00 |
| 2019/0176395 A1* | 6/2019 | Roman | B29C 64/25 |
| 2020/0009793 A1* | 1/2020 | Leonard | B29C 64/386 |
| 2020/0331199 A1* | 10/2020 | Herzog | B33Y 10/00 |

FOREIGN PATENT DOCUMENTS

| | | |
|---|---|---|
| CN | 105027072 A | 11/2015 |
| WO | WO-2015176709 | 11/2015 |
| WO | WO2016075025 | 5/2016 |

OTHER PUBLICATIONS

"Almco Offers Speedy Post-Processing Cabinets for 3D Printing Workflows"; Mar. 7, 2015; https://3dprint.com/49343/almcospeedypostprocessing/.

* cited by examiner

ADDITIVE MANUFACTURING SYSTEM AND METHOD FOR POST-PROCESSING

BACKGROUND

In the additive manufacturing technology, using so-called three-dimensional (3D) printers, for example, three-dimensional objects may be built by adding successive layers of material to form a series of cross-sections which are joined to create a final object. The material may be a powder, such as plastic, metal, or other composite materials, and the material may be fused to create the final object. Another additive manufacturing technology may form multiple layers of powder, and then selectively solidify portions of the layer to form a fused/sintered cross-section of an object. A selected portion of each layer may be solidified to form a layer of a 3D object.

The quality of the objects produced by additive manufacturing may vary widely depending on a number of parameters, including printer settings, settings of a build unit, and post-processing settings.

DETAILED DESCRIPTION OF DRAWINGS

Figure 1:
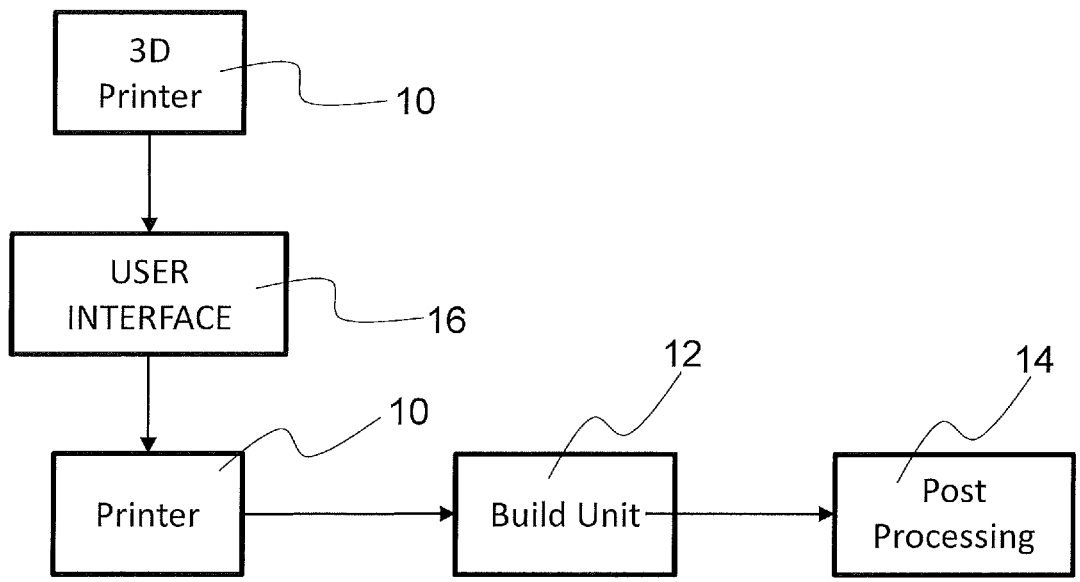
FIG. 1 shows a schematic diagram of a data flow in one example of 3D printing environment.

FIG. 1 shows a schematic diagram of a data flow in one example of a 3D printing environment, also referred to as an additive manufacturing system. The system of this example comprises a 3D printer 10, a build unit 12, and a post-processing unit 14. A user interface 16 may be provided as part of the printer 10 and/or the build unit 12 and/or the post-processing unit 14 or in a separate entity. These components may be coupled communicatively via interfaces for wireless or wired communication wherein the interfaces may connect to a network and/or may use direct connections between the components. Whereas FIG. 1 shows a unidirectional data flow, data may also be communicated in both directions.

In an additive manufacturing or 3D printing process, the successive layers of build material, such as powder are deposited by the printer on a build platform. The build platform may be provided in a build unit which controls vertical movement of the platform. Each new layer is built on top of the previous layer, usually after the previous layer has been processed. During the additive manufacturing process, the build platform moves downward step by step in defined increments corresponding to the layer thickness to give room for the next layer of build material. The build unit may be mounted on a trolley to be transported to the printer and from the printer to the post-processing station.

A three-dimensional (3D) printer comprises a print head which may be mounted on a carriage, wherein the carriage is configured to move in one or two dimensions across the plane parallel to and above the build platform. Using a page-wide array print head, one pass of the print head in one dimension can cover the entire print area. Layers of build material are formed on top of the build platform or a substrate carried by the platform. After one material layer has been deposited, the print head can deposit a fusing agent in a pattern based on the cross-section of a layer of an object to be generated. Fusing energy is applied uniformly across the layer of build material. Those portions of the build material on which fusing agent has been applied absorb more fusing energy than those portions on which no fusing agent was applied and hence heat up more quickly, and fuse. After each layer is deposited and processed, the platform is lowered step-by-step, in increments corresponding to one layer advance. Whereas, reference is made to the deposition powder, other build materials can be used, and the expression "powder" is meant to comprise all these other additive manufacturing materials.

When the object generation process is complete, what is present is a mass of fused and unfused powder, or "build volume" or "cake". In such system this whole volume of powder is post-processed to remove the unfused powder and to allow recovery of the generated objects. The process of removing the unfused powder is referred to as uncaking. During uncaking, the unfused build material is removed from the printed part wherein some powder, closer to the part, can be removed by air or sandblasting. The retrieved powder may be recycled and reused. Further, the object may be cooled. Accordingly, the build volume may be transferred to a post-processing unit where it is cooled, and where unfused powder may be removed. Cooling also can be performed outside of the post-processing unit, e.g. by natural cooling during the transfer from the 3D printer to the post-processing unit.

FIG. 1 shows an example of data flow for controlling printing and post-processing. In this example, the printer 10 may be queried by an application to process a 3D print job and to present print profile options for the print job. The query may be received from a computing device (not shown in FIG. 1), such as a workstation, a server, a remote computer etc., which may be connected to the printer 10 via a network, such as an LAN or the Internet, or which may be directed coupled to the printer 10. In response to the query, the printer 10 may send print profile options to the user interface 16. The print profile options will depend on the requested print job and may allow a user to select settings via the user interface 16. The settings may include selecting one of a plurality of complete print profiles or a print mode, as described in further detail below. Accordingly, a user can select a print profile, and the print profile determines a set of operation parameters for implementing the selected print profile or print mode. In another example, the print profile options may allow the user to select and set individual print and post-processing parameters or groups of such parameters, as also described in further detail below.

The user interface 16 receives the settings, and a printing profile and a post-processing profile is determined based on the settings. The printing profile may be determined in a processor (not shown in FIG. 1) of the printer 10 or associated with the printer 10 but also may be determined in a separate computing unit and sent to the printer 10. In other examples, the post-processing profile may be determined in the same processor or computing unit associated with the printer 10, based on the settings. In other examples, the settings may be transferred to the post-processing unit 14 and the post-processing profile may be determined in a processor (not shown in FIG. 1) of the post-processing unit 14 or associated with the post-processing unit 14.

The printer 10 then processes the print job using the printing profile determined. The printing profile may prioritize certain properties of the printed 3D object. For example, if an object having high mechanical properties is to be printed, the printing profile will be configured to select a low carriage speed, a small layer thickness, and other parameters suitable for meeting a defined minimum mechanical stability, etc. For printing the 3D object, the build unit 12 is inserted into the printer 10, the build unit 12 carrying the object during manufacture on its printing platform which moves down vertically as one layer after the others deposited.

Once the 3D object is completed, the build unit 12 is removed from the printer 10, the build unit 12 still carrying the printed object. In the example shown in FIG. 1, the printer 10 transfers post-processing parameters to the build unit 12. The printer 10 may transfer either an entire post-processing profile, or parameter settings or instructions which the post-processing unit 14 can use for determining the appropriate post-processing profile. In the following, reference is made to post-processing parameters, meaning either individual post-processing parameters, or an entire post-processing profile, or instructions which the post-processing unit can use to determine the post-processing profile.

The post-processing parameters are stored in the build unit 12 and are transferred to the post-processing unit 14 when the build unit 12 is moved from the printer 10 to the post-processing unit 14. Accordingly, the printer 10 may be communicatively coupled to the build unit 12 when the build unit is located in the printer 10, and the build unit 12 may be communicatively coupled to the post-processing unit 14 when the build unit 12 is at the post-processing unit 14. Alternatively, the post-processing parameters may be transferred from the printer 10 to the post-processing unit 14 directly via a network or other communication link.

Continuing with the example of an object having high mechanical properties, the post-processing profile can be configured to select a slow cooling down profile including specific temperature plateaus, for example. The post-processing unit 14 performs post-processing the printed 3D object using the post-processing profile parameters received from the printer 10 via the build unit 12.

The method may be implemented on a non-transitory processor readable medium containing a set of instructions thereon, which when executed by a processor cause the processor to present printing options of a 3D print process at a user interface; accept settings from the user interface based on the presented printing options; send instructions relating to a print job to a 3D printer, the instructions including at least one parameter setting to manufacture a three-dimensional (3D) object; and send instructions relating to a post-processing job to a post-processing station, the instructions including at least another parameter setting. In one example, the medium is implemented in a memory of the printer 10.

Figure 2:
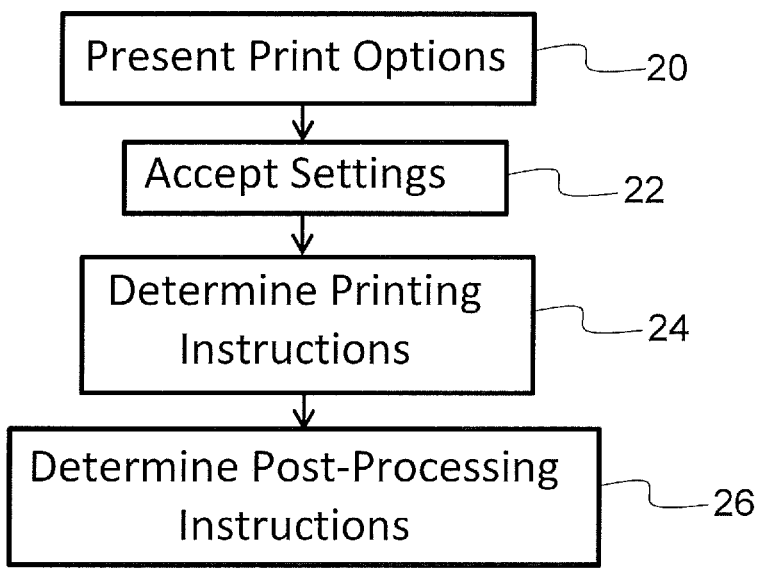
FIG. 2 shows a flow diagram of one example of a method of controlling a 3D printing process.

FIG. 2 shows a flow diagram of one example of a method of controlling a 3D printing process. The method may be a controller implemented method. For example, it may be implemented in a processor provided in the printer 10. In the example of FIG. 2, the process starts with presenting printing options 20 of a 3D printing process. The printing options may be presented at a user interface, such as the user interface 16 of FIG. 1. The printing options may be presented in response to an application requesting a print job wherein the printing options may be obtained from the application and/or a printer, such as the printer 10 of FIG. 1. The process proceeds with accepting settings 22 from the user interface based on the presented printing options. The settings may relate to the selection of an entire printing and post-processing profile or to the selection and setting of individual parameters or a group of parameters relating to the operation of a 3D printer, a build unit, and/or a post-processing unit.

Presenting the printing options 20 may comprise presenting descriptions of printing and post-processing parameters for a plurality of print modes. Examples of print modes comprise high mechanical properties mode, high accuracy & details mode, fast mode, high or medium or low resolution mode, draft mode, etc. . . . . . Further, examples of printing parameters which may be provided by the application may relate to print time modeling, such as the time allowed per slice, slice thickness, shrinkage compensation, selection of printing powder, print agents and additives, to just name a few. Examples of printing parameters which may be applied by the printer may relate to the layer thickness; mechanical print parameters, such as carriage movement, powder management, servicing type and intervals, etc.; thermal print parameters, such as powder preheat, bed temperature, fusing temperature, fusing power, fusing speed, etc.; and imaging print parameters, such as agent density, print passes, agent firing sequence, etc., again just to name a few. Examples of post-processing parameters which may be applied by the post-processing unit may relate to cooling profiles, cooling speed, and active cooling settings, such as airflow, material removal rates, temperature management, again just to name a few.

Presenting the printing options may comprise presenting a menu for at least one of selecting and setting printing and post-processing parameters or selecting and setting one of a number of printing and post-processing profiles, each profile including a number of parameters.

After the settings have been accepted, the process proceeds to determine printing instructions 24 and to determine post-processing instructions 26. The printing instructions 24 may represent a print job or may be used to determine the print job to be used to manufacture a three-dimensional object. The post-processing instructions 26 may represent post-processing job or individual parameters or settings to be used for determining a post-processing job. As indicated above, the post-processing job can be determined in the printer 10 or the post-processing unit 14, or even in the build unit 12 based on the settings.

Whereas FIG. 1 shows the user interface 16 to be associated with the printer 10, the user interface could also be associated with the build unit, and the post-processing job can be determined based on the post-processing instructions in the printer 10, the build unit 12 or the post-processing unit 14. If the post-processing job is determined in the printer 10 or the build unit 12, it may be stored in the build unit and transmitted to the post-processing unit by the build unit. Alternatively, post-processing instructions can be transmitted to the post-processing unit by the build unit, and the post-processing unit determines the post-processing job.

Figure 3:
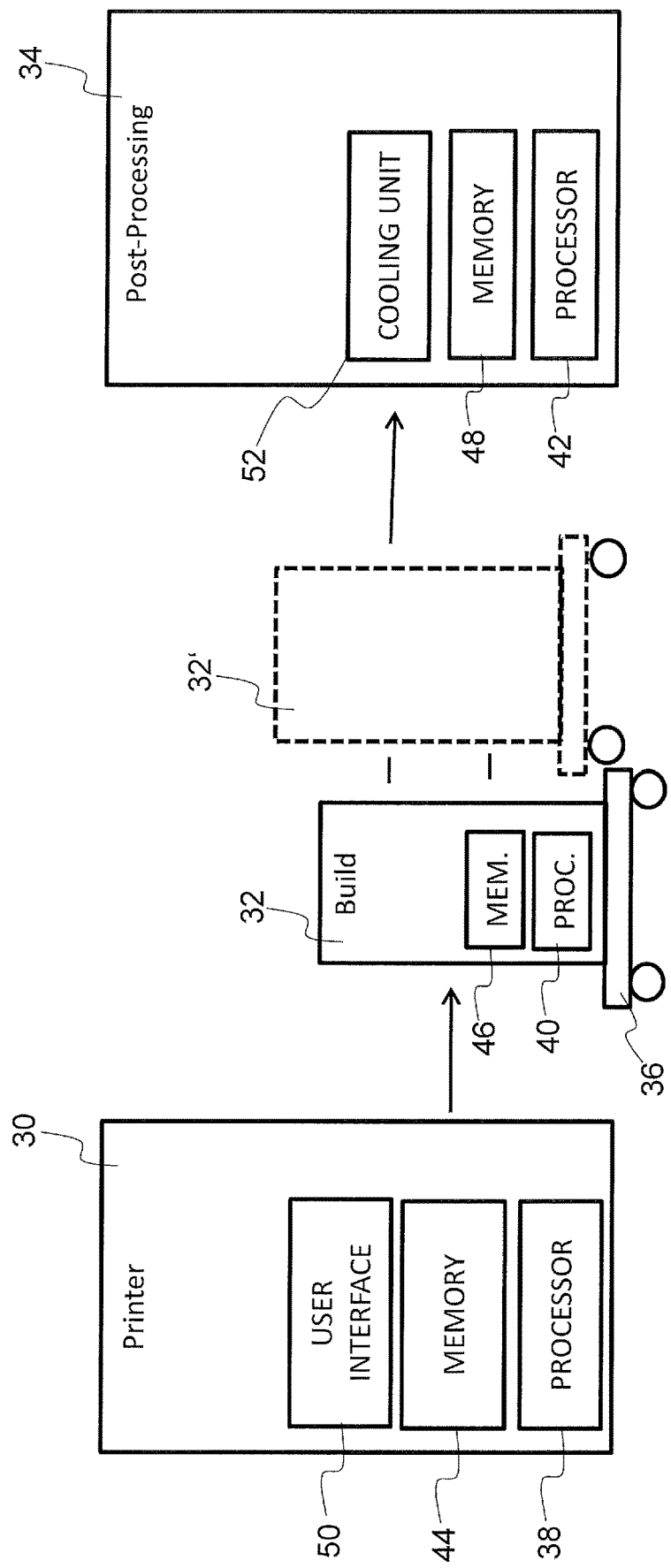
FIG. 3 shows a schematic diagram of an example of an additive manufacturing system.

FIG. 3 shows a schematic diagram of an example of an additive manufacturing system. The example of the additive manufacturing system shown in FIG. 3 comprises a printer 30, the build unit 32, and a post-processing unit or post-processing station 34. The printer 30 may be a 3D printer, as described above. The build unit 32 may be introduced into the printer 30 during manufacture of a three-dimensional object, as also described above. The build unit 32 may be provided on a trolley 36 for moving the build unit 32 to the printer 30 and from the printer 30 to the post-processing unit 34. Movement of the build unit 32 is suggested by the dashed line reproduction 32' of the build unit. Each one of the printer 30, the build unit 32, and the post-processing unit 34 may comprise a respective dedicated processor 38, 40, 42 and a respective dedicated memory 44, 46, 48, as shown in FIG. 3. Further, in the example shown in FIG. 3, the printer comprises a user interface 50. Alternatively or additionally, a user interface may be provided at the build unit 32 or even at the post-processing unit 34 or at a remote terminal.

In one example, the user interface 50 of the printer 30 may be used for presenting printing options of a 3D printing process to a user and accepting settings from the user. The processor 38 of the printer 30 can determine printing instructions and post-processing instructions based on the user settings, and the instructions can be stored in the memory 44. The printer 30 and the build unit 32 can be coupled by a communication link, and the post-processing instructions can be transferred from the printer 30 to the build unit 32 and stored in the memory 46 of the build unit 32. Further, the build unit 32 and the post-processing unit 34 can be coupled by a communication link, and the post-processing instructions can be transferred from the build unit 32 to the post-processing unit 34. In one example, the post-processing instructions are transferred from the build unit 32 to the post-processing unit 34 when the build unit 32 is at the post-processing unit 34. The post-processing unit 34 may comprise a cooling unit 52.

Other configurations are possible. For example, the user interface 50 can be provided at a different entity. Presenting printing options and accepting settings can be performed at the same user interface can be distributed over several interfaces. Communication links between the printer and the build unit, between the build unit and the post-processing unit or between the printer and the post-processing unit can be established when one of these entities is at another one of these entities or when the entities are remote from one another, using wireless or wired communication and/or a communication network or communication bus.

The printing options presented at the user interface can describe processing profiles and processing parameters that encompass both printing and post-processing. The profiles and parameters can be presented to client applications which are submitting print jobs. Presenting the printing options and accepting the settings for both printing and post-processing enables managing user selected profile data through the printing and post-processing system across multiple devices. It becomes possible to expose control of an entire additive manufacturing process or 3D printing process to a user application submitting a print job—from print material selection to cooling parameters. The system disclosed herein enables the information from the client application and the settings input by the user to flow from the client to multiple devices which employ the specified settings. The printing instructions and post-processing inWO structions determined based on the settings can be distributed among the multiple devices regardless of whether they are network-connected or not. It is possible to transfer the post-processing profile information or post-processing instructions from the 3D printer to the post-processing unit via the build unit, even if the post-processing unit is not connected to the printer or a network.

Figure 4:
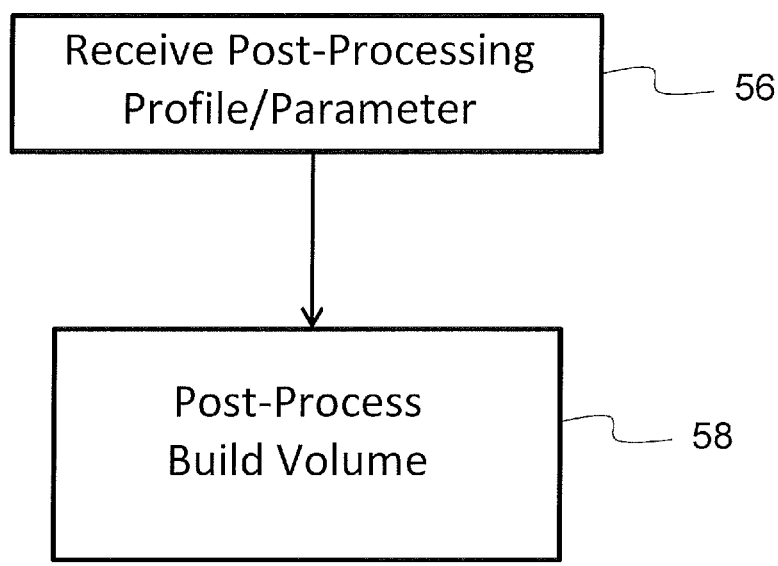
FIG. 4 shows a flow diagram of one example of controlling a post-processing unit.

FIG. 4 shows a flow diagram of one example of controlling a post-processing unit. The post processing unit receives a post-processing profile or at least one post-processing parameter from the build unit when the build unit is transferred to the post-processing unit, see block 56. As described above, the post-processing profile or at least one post-processing parameter can be determined in the printer based on the selection of a print profile or parameter settings, and can be transferred from the printer to the build unit. The post-processing unit then can process the build volume based on the received post-processing profile or parameter(s), see block 58. For example, the profile may define a specific amount of time of natural cooling before uncaking so that the post-processing unit should not operate to uncake until the specified time has passed. In another example, the profile may define a specific cooling profile, including at least one cooling temperature and time so that the post-processing unit should not operate to uncake until the cooling profile has been completed.

The method and the additive manufacturing system disclosed herein provide a single end-to-end control over the entire printing and post-processing steps for a print job.

The invention claimed is:

1. An additive manufacturing system, the system comprising:
a user interface to obtain printing and post-processing options from a three- dimensional printer and post-processing unit, the user interface to then receive user selection of printing and post-processing options from a user;
a three-dimensional (3D) printer and a build unit, the 3D printer to provide the printing options to the user interface and receive user-selected options from the user interface, the 3D printer to then produce a specified object using the user-selected options; and
a post-processing unit to receive user-selected options from the user interface and conduct post-processing of the object using the user-selected options;
wherein a memory for storing instructions based on the user-selected options is provided in the build unit,
the system further comprising a first communication link between the 3D printer and the build unit, and a second communication link between the build unit and the post-processing unit, wherein the first and second communication links are to transmit post-processing instructions based on the user-selected options to the post-processing unit when the build unit is transferred from the 3D printer to the post-processing unit.

2. The system of claim 1, wherein the user interface is incorporated in the 3D printer.

3. The system of claim 1, wherein the build unit comprises a trolley moveable between the 3D printer and the post-processing unit.

4. The system of claim 1, wherein the post-processing options comprise time allotted for cooling before uncaking, active cooling settings and material removal rate.

5. A controller-implemented method of controlling a three dimensional (3D) printing process, the method comprising:
at a user interface, querying a 3D printer and post-processing unit to obtain available printing options and post-processing options for the 3D printing process;
presenting the printing and post-processing options of the 3D printing process at the user interface to provide a single end-to-end control over all printing and post-processing steps for a print job in the user interface;
accepting user input at the user interface comprising settings based on the presented printing and post-processing options;
determining a printing instruction for the print job based on the user input settings, the printing instruction to be used to manufacture a three-dimensional (3D) object;
determining a post-processing instruction for the print job based on the user-input settings, the post-processing instruction to be used in post-processing the 3D object; and providing the printing and post-processing instructions based on the user-input setting for the print job to a system to manufacture the 3D object accordingly;

moving a build unit between the 3D printer and the post-processing unit, the build unit comprising a build platform on which a 3D object is formed by the 3D printer and storage for the post-processing instructions; and wherein providing the printing and post-processing instructions to the system to manufacture the 3D object comprises, with an interface of the moveable build unit, forming a communications link by interfacing the storage with the post-processing unit when the moveable build unit is moved to the post-processing unit, the interface providing the post-processing instructions from the storage to the post-processing unit.

6. The method of claim 5, wherein presenting the printing and post-processing options comprises presenting descriptions of printing and post-processing parameters for a plurality of print modes.

7. The method of claim 6, wherein presenting the printing and post-processing options comprises presenting a menu for at least one of selecting and setting printing and post-processing parameters or selecting and setting one of a number of printing and post-processing profiles, each profile including a number of parameters.

8. The method of claim 5, wherein the user interface is incorporated in the build unit moveable between the 3D printer and a post-processing unit.

9. The method of claim 5, wherein a post-processing job specified by the post-processing instruction comprises parameters for at least one of: cooling and uncaking the 3D object.

10. The method of claim 5, wherein the user interface is incorporated in the 3D printer.

11. The method of claim 5, wherein the printing options comprise parameter options, include at least one of: a material selection option; a print time model option; a print mode option; a layer thickness option; a shrinkage compensation option; a thermal print option; a mechanical print option; an imaging print option; a cooling profile option; a cooling speed option; an active cooling option; or a combination thereof.

12. The method of claim 5, wherein the post-processing instruction comprises one of: time allotted for cooling before uncaking, active cooling settings and material removal rate.

13. The method of claim 5, wherein the settings comprise a cooling period with specific temperature plateaus to achieve a minimum mechanical stability in the 3D object.

14. A system for additive manufacturing, the system comprising:

a user interface to receive a number of printing and post-processing options available in a three-dimensional (3D) printer and post-processing unit, present the printing and post- processing options to a user, wherein the user interface is to provide thereby a single end-to-end control over all printing and post-processing steps for a print job, the user interface further to receive user input defining a printing and post-processing profile based on user- selected options from among the printing and post-processing options; and a processor to determine system end-to-end instructions for the print job based on the user input, the instructions to be used to manufacture a three-dimensional (3D) object of the print job;

a communications link to output instructions for execution by the 3D printer and post-processing unit; and a build unit moveable between the three-dimensional (3D) printer and the post-processing unit, the build unit comprising a build platform on which a 3D object is formed by the 3D printer and storage for post-processing instructions from the end-to-end instructions, wherein the communications link comprises an interface for interfacing the storage with the post-processing unit when the moveable build unit is moved to the post-processing unit, the interface providing the post-processing instructions to the post-processing unit.

15. The system of claim 14, further comprising a cooling unit.

16. The system of claim 14, wherein the user interface is incorporated in the 3D printer.

17. The system of claim 14, wherein the user interface is incorporated in the moveable build unit.

* * * * *